(12) United States Patent
Parkvall et al.

(10) Patent No.: US 10,728,890 B2
(45) Date of Patent: Jul. 28, 2020

(54) FLEXIBLE TRANSMISSION GRID

(71) Applicant: Telefonaktiebolaget LM Ericsson (publ), Stockholm (SE)

(72) Inventors: Stefan Parkvall, Bromma (SE); Robert Baldemair, Solna (SE); Erik Dahlman, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/551,255

(22) PCT Filed: Jun. 16, 2017

(86) PCT No.: PCT/IB2017/053600
§ 371 (c)(1),
(2) Date: Aug. 15, 2017

(87) PCT Pub. No.: WO2017/221121
PCT Pub. Date: Dec. 28, 2017

(65) Prior Publication Data
US 2018/0288752 A1 Oct. 4, 2018

Related U.S. Application Data

(60) Provisional application No. 62/352,442, filed on Jun. 20, 2016.

(51) Int. Cl.
*H04W 72/04* (2009.01)
*H04L 1/00* (2006.01)
(Continued)

(52) U.S. Cl.
CPC ......... *H04W 72/044* (2013.01); *H04L 1/0072* (2013.01); *H04L 27/2607* (2013.01);
(Continued)

(58) Field of Classification Search
CPC .............. H04W 72/044; H04W 72/042; H04L 27/2607
See application file for complete search history.

(56) References Cited

U.S. PATENT DOCUMENTS

| 10,085,255 B2* | 9/2018 | Patel ................. H04W 72/0446 |
| 2013/0010714 A1* | 1/2013 | Kim ...................... H04L 1/0038 |
| | | 370/329 |

(Continued)

FOREIGN PATENT DOCUMENTS

| EP | 3244678 A1 | 11/2017 | |
| WO | WO 2016/070436 | * 5/2016 | ............ H04W 56/00 |

OTHER PUBLICATIONS

Ericsson; "DCI for short TTI uplink transmissions", 3GPP Draft; (Latred R1-160938_UL_DCI, 3rd Generation Partnership Project (3GPP), Mobile Competence Centre; 650, Route Des Lucioles; F-06921 Sophia-Antipolis Cedex, France, vol. RAN WG1, No. Malta; Feb. 15, 2016-Feb. 19, 2016, Feb. 14, 2016, XP051053552, Retrieved from the Internet; URL:http://www.3gpp.org/ftp/Meetings_3GPP_SYNC_RAN1_Docs/ (retrieved on Feb. 14, 2016), 7 pages.

(Continued)

*Primary Examiner* — Mohammad S Anwar

(57) ABSTRACT

A system and method for scheduling a transmission of a message in a communication system. In an embodiment, the method includes identifying major reference points and minor reference points associated with a subframe. The method also includes scheduling a transmission of the message to begin on one of the minor reference points between the major reference points.

18 Claims, 8 Drawing Sheets

(51) Int. Cl.
  *H04L 27/26* (2006.01)
  *H04L 5/00* (2006.01)
(52) U.S. Cl.
  CPC ...... *H04L 27/2656* (2013.01); *H04L 27/2692* (2013.01); *H04W 72/042* (2013.01); *H04L 5/0007* (2013.01); *H04L 27/2675* (2013.01)

(56) References Cited

U.S. PATENT DOCUMENTS

| | | | | |
|---|---|---|---|---|
| 2013/0039193 | A1* | 2/2013 | Yin | H04W 72/0486 370/252 |
| 2016/0345206 | A1* | 11/2016 | Yerramalli | H04W 74/006 |
| 2017/0332365 | A1* | 11/2017 | Lin | H04W 72/0406 |

OTHER PUBLICATIONS

Ericsson: "Overview of TTI shortening and reduced processing time for UL transmissions", 3GPP Draft; (latred) R1-160937 Overview_of_TTI_Shortening_and_Reduced_Processing_Time_for_UL_Transmissions, 3rd Generation Partnership Project (3GPP), Mobile Competence Centre; 640 Route Des Luciole, vol. RAN WG1, No. Malta; Feb. 16, 2016-Feb. 19, 2016 Feb. 14, 2016, XP051053551, Retrieved from the Internet; URL:http://www.3gpp.org/ftp/Meetings_3GPP_SYNC_RAN1_Docs/ (retrieved on Feb. 14, 2016), 5 pages.
Samsung: Discussion on sPDSCH 11, 3GPP Draft; RI-164795—Discussion on SPDSCH, 3rd Generation Partnership Project (3GPP), Mobile Competence Centre ; 650, Route Des Lucioles; F-06921 Sophia-Antipolis Cedex ; France • vol. RAN WGI, No. Nanjing, China; May 26, 2016-May 27, 2016, May 14, 2016 (May 14, 2016), XP051096322, Retrieved from the Internet: URL:http://www.3gpp.org/ftp/tsgran/WGI RL/TSGRI 85/Docs/ [retrieved on May 14, 2016] the whole document, 5 pages.
Related PCT case PCT/IB2017/053600, Notification of Transmittal of the International Search Report and The Written Opinion of the International Searching Authority dated Sep. 22, 2017, 18 pages.
Application No. 17 735 634.2—1220 European Office Action dated Feb. 13, 2019, 6 pages.
"Short TTI for DL Transmissions", 3GPP TSG RAN WG1 Meeting #84 (R1-160292), St Julian's, Malta, Feb. 15-19, 2016, 7 pages.
Ericsson: "Downlink control signaling design for short TTI", 3GPP Draft; R1-163322 Downlink Control Signal Design for Short TTI, vol. RAN WG1, No. Busan; (Apr. 1, 2016), XP051079812.
Application No. 17 735 634.2—1220 European Office Action dated Oct. 10, 2019, 5 pages
Ericsson, "DCI for sTTI scheduling", 3GPP TSG-RAN WG1 #85, Nanjing, P.R. China, May 23-27, 2016, pp. 1-5, R1-165294, 3GPP.
Nokia et al, "On two-level DL control channel design for shorter TTI operation", 3GPP TSG-RAN WG1 #85, Nanjing, P.R. China, May 23-27, 2016, pp. 1-5, R1-165237, 3GPP.
Lenovo, "Design of UL channels for shortened TTI", 3GPP TSG-RAN WG1 #85, Nanjing, P.R. China, May 23-27, 2016, pp. 1-4, R1-164650, 3GPP.
Huawei, "DCI design for short TTI", 3GPP TSG-RAN WG1 #85, Nanjing, P.R. China, May 23-27, 2016, pp. 1-15, R1-164060, 3GPP.

* cited by examiner

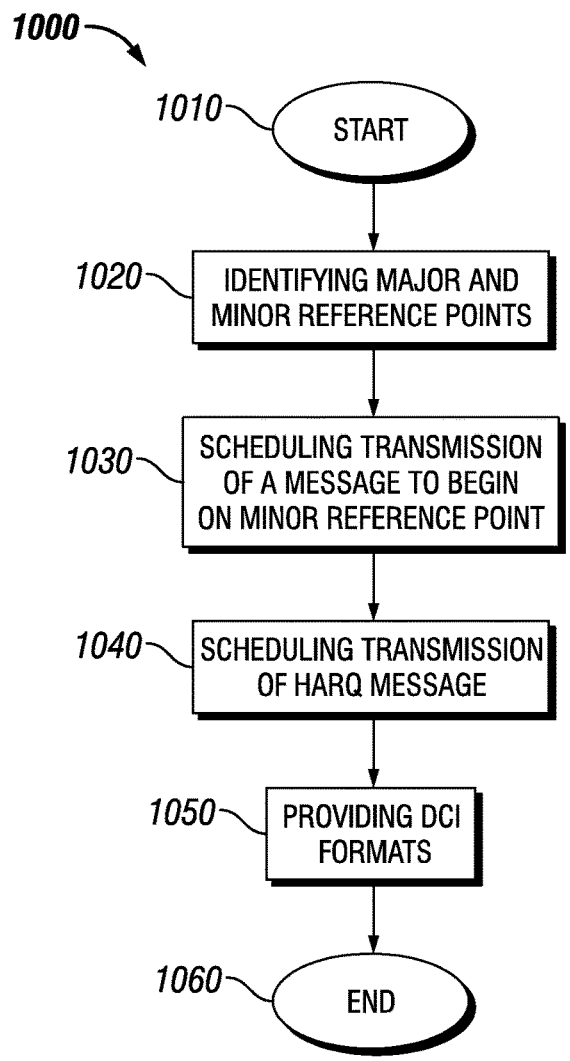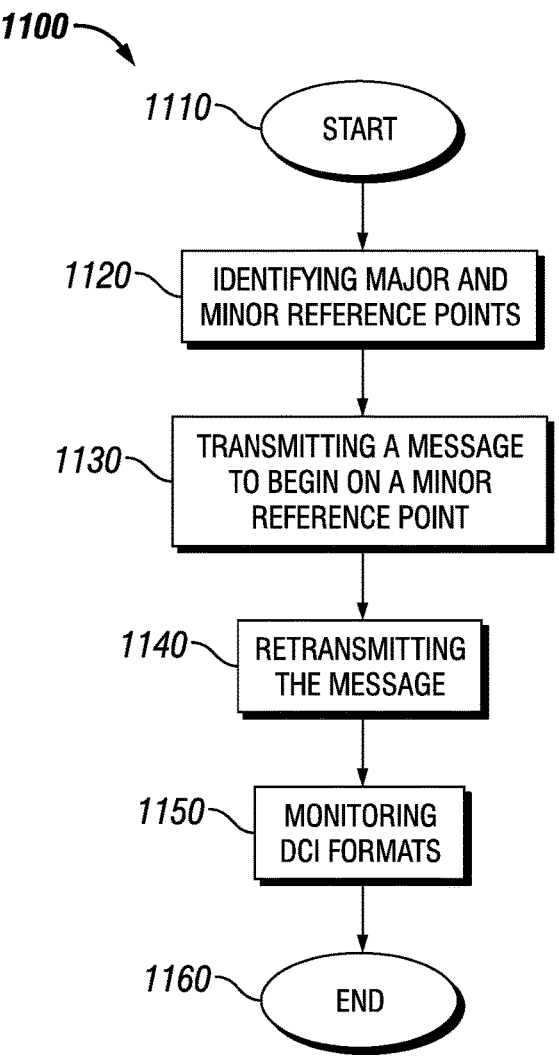
FIG. 10
FIG. 11

FLEXIBLE TRANSMISSION GRID

This application claims the benefit of U.S. Provisional Application No. 62/352,442 entitled "Flexible Transmission Grid," filed Jun. 20, 2016, which is incorporated herein by reference.

TECHNICAL FIELD

The disclosed subject matter relates generally to telecommunications and, more particularly, to flexible transmission scheduling in radio access telecommunications systems.

BACKGROUND

Proposed New Radio (NR) radio access technologies are similar to Long Term Evolution (LTE) technologies based on orthogonal frequency division multiplexing (OFDM). Transmissions in LTE (and many other wireless communication schemes) are organized in subframes. In case of LTE, a subframe consists of 14 consecutive OFDM symbols. The subframe structure provides a common time reference between the transmitter and receiver as well as a structured way of describing the relation between, for example, data and the associated control signaling. The transmission of messages start at the beginning of a subframe (or a fixed time related to the start of a subframe).

Uplink (UL) and downlink (DL) messages are typically scheduled. In other words, for each time instant the scheduler determines to which device to transmit messages and which device(s) that are supposed to transmit messages. These scheduling decisions are communicated to the devices using Layer 1/Layer 2 (L1/L2) control signaling. In LTE, the L1/L2 control signals are located at the beginning of each one millisecond (ms) subframe. The device is, for each subframe, monitoring for control signaling relevant for this device. A number of candidate messages are monitored using so called blind decoding where the device attempts to decode a number of candidate control messages in each subframe and determine whether any of these messages are for the device in question. The larger the number of control channel candidates the larger the flexibility in the network operation. For instance, in terms of supporting different features potentially requiring differently-sized control messages, but also the higher the device complexity in terms of blind decoding attempts.

For data transmission, hybrid automatic repeat request (HARQ) functionality is often employed where the receiver can request retransmission of erroneous data from the transmitter. To support this functionality there is a need for feedback from the receiver to the transmitter (or scheduler) in the form of a HARQ acknowledgement. From a latency point-of-view, the HARQ acknowledgements should come as soon as possible after data reception.

Defining the transmissions of data and/or messages in terms of subframes results in several drawbacks. For example, the transmissions are restricted to start at subframe boundaries only. The subframe duration thus has a direct impact on the lowest possible latency. Moreover, operation in unlicensed spectrum typically requires a listen-before-talk procedure. Once the radio channel is declared available, data transmissions should ideally start as soon as possible to avoid other user equipment grabbing the channel. Restricting transmissions to start at subframe boundaries only will thus either result in decreased likelihood of grabbing the channel or, if a dummy signal is transmitted until the start of a subframe, unnecessary overhead. Furthermore, to enable relaxed synchronization requirements, it is advantageous to enable later data transmissions in a subframe and by that create a guard period at the beginning of the subframe. The restrictions inherent in the use of subframes for data transmissions do not permit such flexibility.

SUMMARY OF THE INVENTION

These and other problems are generally solved or circumvented, and technical advantages are generally achieved, by advantageous embodiments of the present invention for a system and method for scheduling a transmission of a message in a communication system. In an embodiment, the method includes identifying major reference points and minor reference points associated with a subframe. The method also includes scheduling a transmission of the message to begin on one of the minor reference points between the major reference points.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 10 to 12 illustrate flow diagrams of embodiments of methods of operating apparatuses;

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

In general, the disclosed subject matter provides systems and methods for flexibly scheduling the transmission of data and/or messages between wireless communication nodes and/or devices (e.g., between a mobile wireless communication device and a radio access node or between two mobile wireless communication devices) that are operable in a radio access telecommunications network or system. In one example, a scheduler in a radio access node is operable to select from a plurality of different transmission interval lengths, transmission interval start times, and/or transmission interval end times to schedule the data transmissions. The transmission intervals are defined with reference to major and minor time reference points or ticks, whose relative spacing and number may also be flexibly configured according to different link types and purposes. In certain embodiments, the scheduler is located in a radio access node transmitting in the uplink and/or downlink. Alternatively, the scheduler may be located in a third node separate from the radio access node and wireless communication device that are transmitting/receiving in the uplink/downlink.

The use of different transmission interval lengths, start time, end times, and timing reference points provides several advantages. For example, transmissions need not start at particular subframe boundaries only, thereby improving latency. Moreover, when used in an unlicensed spectrum context, the system will provide a higher likelihood of grabbing a channel without the use of a dummy signal, which adds overhead. Furthermore, a later data transmission in a subframe that creates a guard period at the beginning of the subframe.

Figure 1:
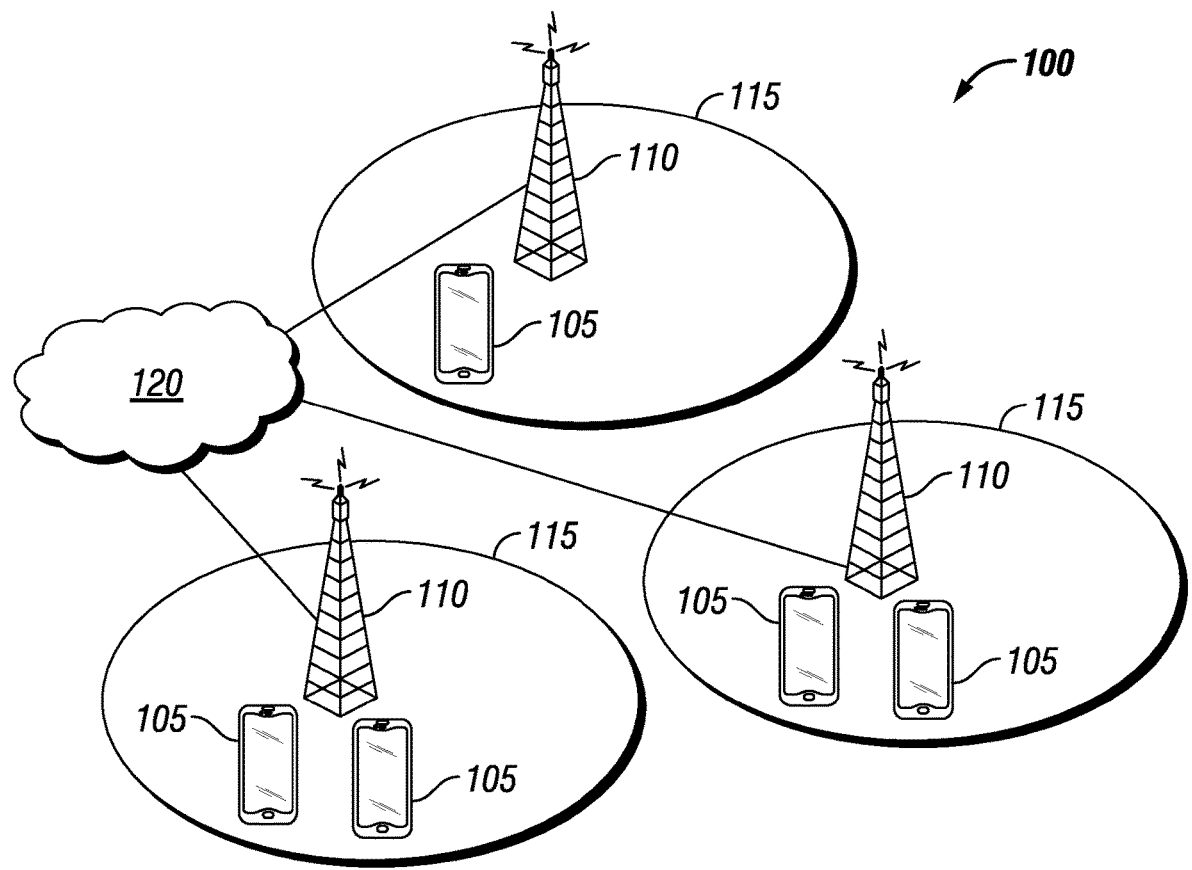
FIG. 1 illustrates a system level diagram of an embodiment of a communication network.

Referring initially to FIG. 1, illustrated is a system level diagram of an embodiment of a communication network (e.g., an LTE network) or system 100 including a plurality of wireless communication devices 105 (e.g., conventional user equipment (UE)), machine type communication (MTC)/machine-to-machine (M2M) devices and a plurality of radio access nodes 110 (e.g., Evolved Node Bs (eNodeBs) or other base stations). The communication network 100 is organized into cells 115 that are connected to a core network 120 via corresponding to radio access nodes 110. The radio access nodes 110 are capable of communicating with wireless communication devices 105 along with any additional elements suitable to support communication between wireless communication devices or between a wireless communication device and another communication device (such as a landline telephone).

Figure 2:
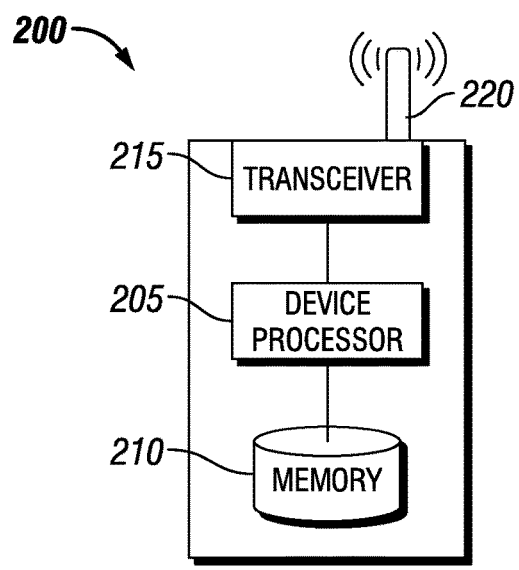
FIG. 2 illustrates a block diagram of an embodiment of a wireless communication device.

Although the wireless communication devices 105 may represent communication devices that include any suitable combination of hardware and/or software, the wireless communication devices 105 may, in certain embodiments, represent devices such as a wireless communication device illustrated in greater detail by FIG. 2. Similarly, although the radio access nodes 110 may represent network nodes that include any suitable combination of hardware and/or software, the radio access nodes 110 may, in particular embodiments, represent devices such as a radio access node illustrated in greater detail by FIG. 3.

Referring to FIG. 2, illustrated is a block diagram of an embodiment of a wireless communication device 200 including a processor 205, a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory 210 shown in FIG. 2. Alternative embodiments may include additional components beyond those shown in FIG. 2 that may be responsible for providing certain aspects of the device's functionality, including any of the functionality described herein.

Figure 3:
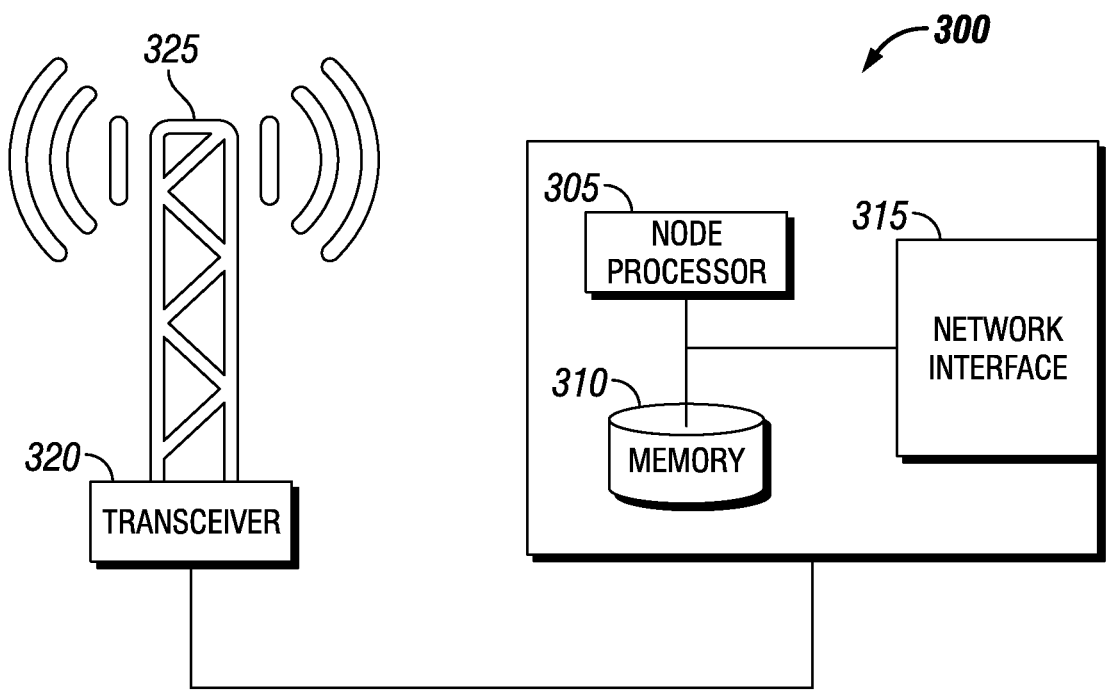
FIG. 3 illustrates a block diagram of an embodiment of a radio access node.

Referring to FIG. 3, illustrated is a block diagram of an embodiment of a radio access node 300 including a node processor 305, a memory 310, a network interface 315, a transceiver 320, and an antenna 325. In certain embodiments, some or all of the functionality described as being provided by a base station, a node B, an eNodeB, and/or any other type of network node may be provided by the node processor 305 executing instructions stored on a computer-readable medium, such as the memory 310 shown in FIG. 3. For example, a scheduler may be implemented using the node processor 305 and/or additional processors (not shown) executing instructions. Alternative embodiments of radio access node 300 may include additional components to provide additional functionality, such as the functionality described herein and/or related supporting functionality.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

In an embodiment, a set of (typically equally or close to equally) spaced time instances or reference points, referred to herein as "minor ticks," are defined, e.g., by a scheduler. The minor ticks may correspond to the start of OFDM symbols, but could also refer to, for instance, every second or every third OFDM symbol. In addition, a set of time instances or reference points, referred to herein as "major ticks" are defined, e.g., by a scheduler. The major ticks and minor ticks are collectively referred to herein as "clock ticks." The major ticks are a subset of the minor ticks. For example, every Nth minor tick could be a major tick (e.g., N=14 could be used to describe the LTE structure), but other, possibly irregular, ways of pinpointing the major ticks may be implemented. The duration between two major ticks may be denoted a "subframe".

Figure 4:
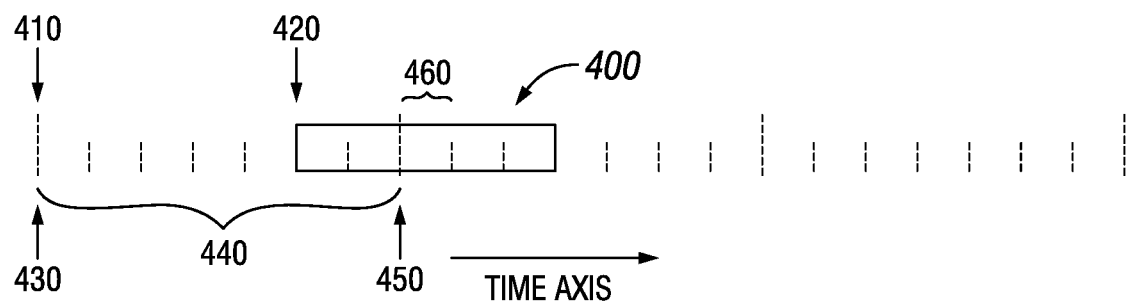
FIG. 4 illustrates a timing diagram demonstrating major reference points and minor reference points as a function of time.

Turning now to FIG. 4, illustrated is a timing diagram demonstrating major reference points (one of which is designated 410) and minor reference points (one of which is designated 420) as a function of time. The major reference points 410 are aligned with boundaries (ones of which are designated 430, 450) of a subframe (one of which is designated 440). From one perspective, the minor reference points 420 are distributed in time between the major reference points 410. From another perspective, the minor reference points 420 on the boundaries 430 of the subframe 440 are referred to as the major reference points 410. A message 400 is set to begin on one of the minor reference points 420 between the major reference points 410. Each section within the subframe 440 may represent an OFDM symbol 460 of the message 400. In the following subsections a number of different but related embodiments are described. The definitions of the major and minor reference points or ticks along a time axis can be adapted differently for the specific requirements of each embodiment and, therefore, do not necessarily have to represent the same time instants (i.e., do not need to be uniformly distributed). As illustrated in FIG. 4, however, the reference points are uniformly distributed in time.

Furthermore, for simplicity the terms "downlink" and "uplink" are used herein without limiting the embodiments to only cellular transmissions with downlink transmissions scheduled by and transmitted from a radio access node (e.g., a base station) and uplink transmissions scheduled by the radio access node, but transmitted from the wireless communication device. For example, in a direct device-to-device scenario, the downlink may correspond to data transmissions from the node scheduling (initiating) the transmission and uplink data transmissions to transmissions from a node not responsible for the scheduling. In another embodiment, the scheduler is located in a third node, separate from the nodes transmitting in downlink and uplink directions, respectively.

Data transmissions may be scheduled to start at a set of minor ticks and span a (possibly varying) number of minor ticks (denoted "interval B" herein). In other words, a length of a message is designated the interval B. Note that interval B can be a different length for some minor ticks (e.g., due to different OFDM symbol durations). The set of minor ticks for a data transmission that represent an interval B may be configurable or pre-defined (e.g., a scheduler may select from any minor tick for the start of an interval B and the number of minor ticks therefor). Thus, the interval B may have a different length as a result of the number of minor ticks, and/or the time between the minor ticks.

Figure 5:
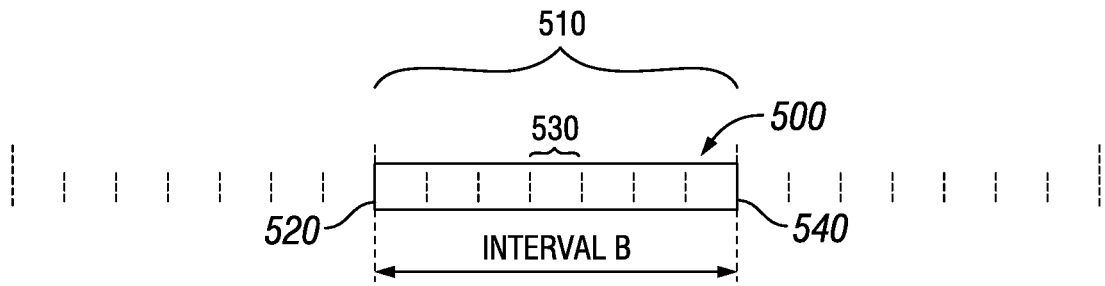
FIGS. 5 to 8 illustrate timing diagrams demonstrating scheduling of a transmission of a message.
Figure 6:
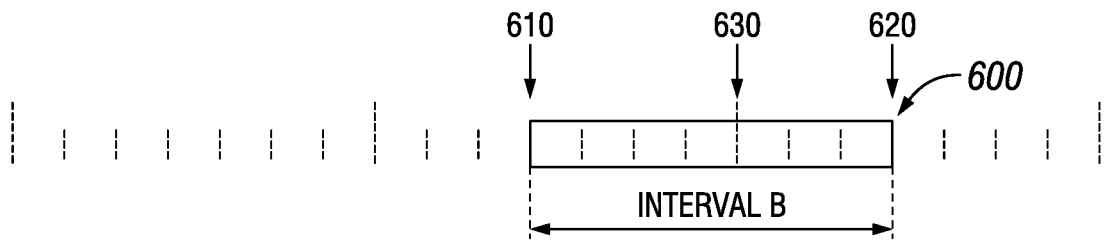
Figure 7:
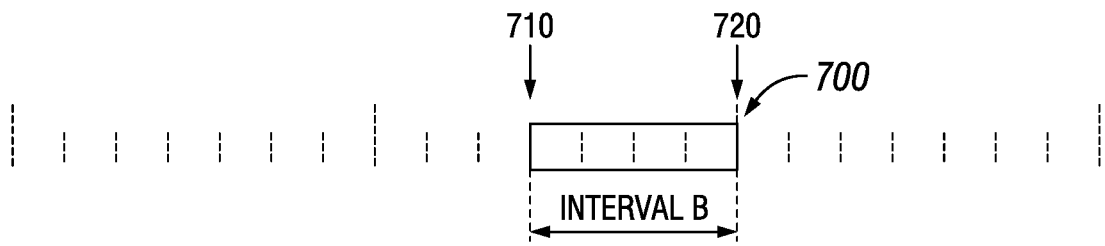
Figure 8:
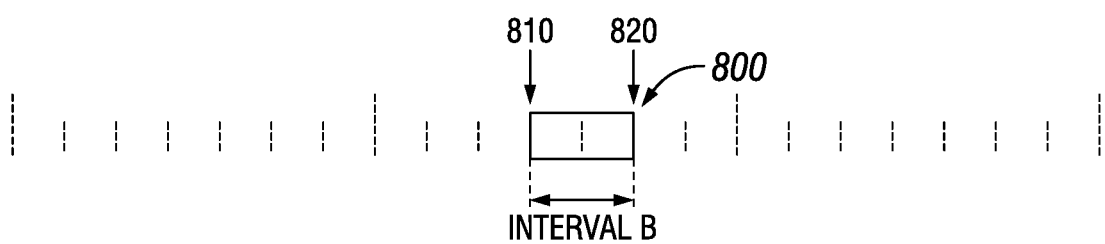

Turning now to FIGS. 5 to 8, illustrated are timing diagrams demonstrating scheduling of a transmission of a message. In FIG. 5, a scheduler selects the start and end of the interval B to coincide with a subframe 510. In other words, the data transmission (or message 500) starts at a subframe boundary (coinciding with major ticks 520, 540) and has a duration equal to the subframe length (i.e., the subframe) 510. Each section within the subframe 510 may represent an OFDM symbol 530 of the message 500. However, other possible interval B configurations may be selected. Basically, there are two, not necessarily coinciding subframe structures, one to describe the time axis (the reference points or ticks) along the horizontal axis of the FIGUREs and one describing the transmitted message or data.

The interval B configuration option depicted in FIG. 5 may be used for, e.g., mobile broadband. In time division duplex (TDD), the interval B may end prior to a major tick to make room for uplink transmissions. In another interval B configuration depicted in FIG. 6, the interval B (for a message 600) is selected to start and end on minor ticks (designated 610, 620), not major ticks (i.e., spans a major tick 630). Such an interval B configuration may be useful for unlicensed operation, where a transmission starts immediately after using a listen-before-talk procedure to find a free radio channel. In a third interval B configuration of FIG. 7, the start of the interval B is not aligned with a major tick, but the end is, which may also be useful for unlicensed operation. In other words, a message 700 begins on a minor tick 710 and ends on a major tick 720. In a fourth interval B configuration of FIG. 8, the interval B start is not aligned with a major tick and is relatively short (e.g., a message 800 spans the duration of two minor ticks 810, 820). Such an interval B configuration may be useful in providing latency critical services where a data transmission can start at any time. Thus, not only may a scheduler select the start and end times, but also a duration of the message.

Figure 9:
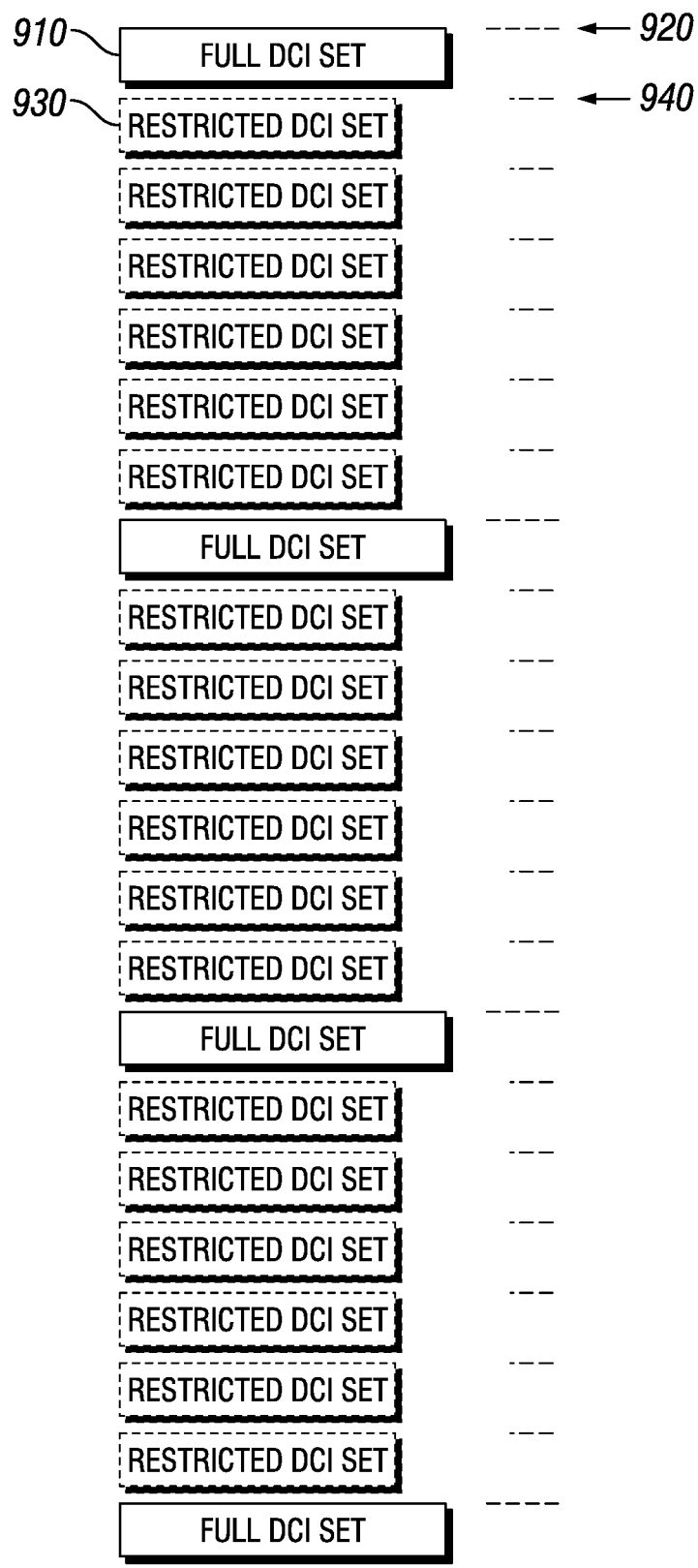
FIG. 9 illustrates a timing diagram of an embodiment of monitoring of downlink control information formats.

Turning now to FIG. 9, illustrated is a timing diagram of an embodiment of monitoring of downlink control information (DCI) formats. Downlink data transmission employs signaling of associated control signaling with control information typically taking place at the beginning of each downlink transmission (interval B). The possibility for more frequent scheduling decisions thus comes at an increased cost in blind decoding of potential control channel candidates in the device. At the same time, the full scheduling flexibility may not be needed for all service types such as latency-critical services. For example, the full range of multi-antenna schemes or the widest scheduling bandwidths may not be needed for this type of transmission. This translates into a smaller number of DCI formats to monitor for these services.

This can be exploited such that a full set of DCI formats (one of which is designated 910) are monitored for the major ticks (one of which is designated 920) or a subset of the major ticks 920. A discontinuous reception (DRX) pattern can be applied so that a user equipment only monitors DCI formats at a subset of major ticks 920. A restricted set of DCI formats (one of which is designated 930) are monitored for the minor ticks (one of which is designated 940) or a subset of the minor ticks 940. The set of minor ticks 940 where the reduced DCI formats are monitored can be configured (e.g., Radio Resource Control (RRC) signaling) or pre-defined such as part of a technical specification. One possibility is to have an empty restricted set (i.e., no DCI monitoring) until the restricted set is configured. In addition, the restricted set of DCI formats 930 is typically but not necessarily a subset of the full set of DCI formats 910. It may also be identical to the full subset (i.e., not a proper subset).

In one embodiment, the major ticks correspond to the start of subframes (e.g., every 1 ms) and the minor ticks correspond to every OFDM symbol (e.g., every $1/14$ ms). In another embodiment, the major ticks correspond to, for instance, radio frames starting every 10 ms and the minor ticks correspond to (sets of) OFDM symbols.

System information is information that can be employed to access the radio access network. Such information is typically not latency critical. It is therefore sufficient to monitor DCI formats related to system information at the major ticks (or a subset thereof) instead of at most or every minor tick. The same or a similar approach may be applied to paging messages, power control commands, and various reconfiguration messages.

Transmission of downlink data typically implies a response in the form of a HARQ acknowledgement. The timing of HARQ acknowledgements can be determined relative to an interval B (for example relative to the end of interval B to reduce latency for the acknowledgement), or 2) relative to a major tick (to ensure acknowledgements from multiple devices are time aligned at the base station reception point). The timing relation to be used may be configured using higher-layer signaling (e.g., RRC signaling), Media Access Control (MAC) signaling, or dynamically signaled as part of the DCI.

Uplink transmissions are typically scheduled. A scheduling grant received in the downlink implies transmission of data in the uplink as controlled by the grant. The start and/or end of the transmission can be determined relative to the reception of the scheduling grant, or relative to a major tick. The timing relation to use may be configured using higher-layer signaling (e.g., RRC signaling), MAC signaling, or dynamically signaled as part of the DCI. Resources for uplink transmissions not directly scheduled (e.g., random access, contention-based uplink transmissions, and grant-free transmissions) can be defined relative to either the major or minor tick grid.

A New Radio carrier can support multiple numerologies simultaneously, for instance, by mixing OFDM transmissions with different subcarrier spacings or cyclic prefixes. Any device/(network) node that supports multiple numerologies can thus have multiple minor tick grids, but can still maintain a single major tick grid. With symbol alignment (i.e., OFDM symbols of the numerology with wider subcarrier spacings (shorter symbols) integer divide longer (narrower subcarrier spacing) OFDM symbols), a less granular minor tick grid can be a subset of the more granular minor tick grid.

Nodes and devices may have different timings for the different link types. For example, in a wireless communication device, the uplink (UL) is timing advanced relative to the downlink (DL). In a radio access node the UL receptions are slightly time advanced relative to DL to enable DL-UL guard periods, and a sidelink may have its own local synchronization not related to UL/DL timing. The methods and principles of using major and minor ticks on a time axis for transmission scheduling are applicable to any link type. Moreover, a device or node may use multiple major and minor tick grids for different link types, at least if the timing between link types is unrelated.

Furthermore, to account for a timing difference between different link types, the grids themselves may be different. For example an alarm sensor could have a fine minor tick grid for the UL to transmit alarms with little as possible delay. DL transmissions may be less critical and thus a less granular minor tick grid may suffice in the DL.

Turning now to FIG. 10, illustrated is a flow diagram of an embodiment of a method 1000 of operating an apparatus such as a radio access node (e.g., a base station 110, 300 of the communication system 100, see FIGS. 1 and 3). While the method 1000 will be described with example steps or modules in an particular order, ones thereof may be removed or the steps or modules reordered as the application dictates. The method 1000 begins at a start step or module 1010. The method 1000 includes identifying major and minor reference points associated with a subframe at a step or module 1020. The identifying may include identifying boundaries of a subframe with major reference points being aligned with the boundaries and minor reference points being distributed in time between the major reference points. The identifying may include identifying minor reference points associated with a subframe, and identifying minor reference points on boundaries of the subframe as major reference points. The major reference points and the minor reference points may correspond to a beginning of an OFDM symbol associated with a message. The major reference points and the minor reference points may be uniformly distributed in time. A distribution of the major reference points and the minor reference points in time may be a function of a communication path for a message.

At a step or module 1030, the method 1000 includes scheduling a transmission of a message to begin on one of the minor reference points between the major reference points. The message 700 may begin on one of the minor reference points and end on a major reference point. The message may begin on one of the minor reference points and end on another one of the minor reference points. The message may span a major reference point. The scheduling may include inserting a guard period at a beginning of a subframe. The scheduling may include selecting a duration of the message.

The method 1000 also includes scheduling a transmission of hybrid automatic repeat request (HARQ) message relative to the transmission of the message at a step or module 1040. The method 1000 also includes providing a full set of DCI formats on at least one of the major reference points and providing a restricted set of DCI formats on at least one of the minor reference points at a step or module 1050. The method 1000 ends at an end step or module 1060.

Turning now to FIG. 11, illustrated is a flow diagram of an embodiment of a method 1100 of operating an apparatus such as a wireless communication device (e.g., a user equipment 105, 200 of the communication system 100, see FIGS. 1 and 2). While the method 1100 will be described with example steps or modules in an particular order, ones thereof may be removed or the steps or modules reordered as the application dictates. The method 1100 begins at a start step or module 1110. The method 1100 includes identifying major and minor reference points associated with a subframe at a step or module 1120. The identifying may include identifying boundaries of a subframe with major reference points being aligned with the boundaries and minor reference points being distributed in time between the major reference points. The identifying may include identifying minor reference points associated with a subframe, and identifying minor reference points on boundaries of the subframe as major reference points. The major reference points and the minor reference points may correspond to a beginning of an OFDM symbol associated with a message. The major reference points and the minor reference points may be uniformly distributed in time. A distribution of the major reference points and the minor reference points in time may be a function of a communication path for a message.

At a step or module 1130, the method 1100 includes transmitting a message to begin on one of the minor reference points between the major reference points. The message may begin on one of the minor reference points and end on a major reference point. The message may begin on one of the minor reference points and end on another one of the minor reference points. The message may span a major reference point. The transmitting may include inserting a guard period at a beginning of a subframe. The transmitting may include selecting a duration of the message.

In the event of an error, the method 1100 also includes retransmitting the message in response to a hybrid automatic repeat request (HARQ) process at a step or module 1140. The method 1100 also includes monitoring a full set of DCI formats on at least one of the major reference points and monitoring a restricted set of DCI formats on at least one of the minor reference points at a step or module 1150. The method 1100 ends at an end step or module 1160.

Figure 12:
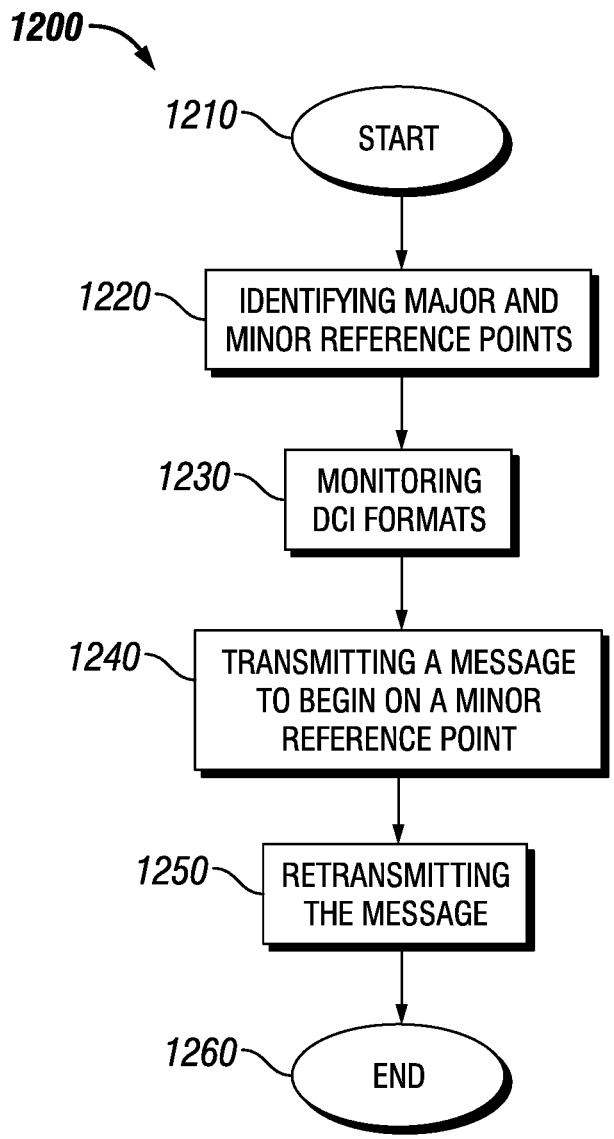

Turning now to FIG. 12, illustrated is a flow diagram of an embodiment of a method 1200 of operating an apparatus such as a wireless communication device (e.g., a user equipment 105, 200 of the communication system 100, see FIGS. 1 and 2). While the method 1200 will be described with example steps or modules in an particular order, ones thereof may be removed or the steps or modules reordered as the application dictates. The method 1200 begins at a start step or module 1210. The method 1200 includes identifying major and minor reference points associated with a subframe at a step or module 1220. The identifying may include identifying boundaries of a subframe with major reference points being aligned with the boundaries and minor reference points being distributed in time between the major reference points. The identifying may include identifying minor reference points associated with a subframe, and identifying minor reference points on boundaries of the subframe as major reference points. The major reference points and the minor reference points may correspond to a beginning of an OFDM symbol associated with a message. The major reference points and the minor reference points may be uniformly distributed in time. A distribution of the major reference points and the minor reference points in time may be a function of a communication path for a message.

At a step or module 1230, the method 1200 includes monitoring a full set of DCI formats on at least one of the major reference points and monitoring a restricted set of DCI formats on at least one of the minor reference points. The method 1200 also includes transmitting a message to begin on one of the minor reference points between the major reference points at a step or module 1240. The message may begin on one of the minor reference points and end on a major reference point. The message may begin on one of the minor reference points and end on another one of the minor reference points. The message may span a major reference point. The transmitting may include inserting a guard period at a beginning of a subframe. The transmitting may include selecting a duration of the message. In the event of an error, the method 1200 also includes retransmitting the message in response to a hybrid automatic repeat request (HARQ) process at a step or module 1250. The method 1200 ends at an end step or module 1260.

The described embodiments may be implemented in any appropriate type of communication system supporting any suitable communication standards and using any suitable components. As one example, certain embodiments may be implemented in an LTE network, such as that illustrated in FIG. 1.

With continuing reference to the aforementioned FIGURES, an apparatus (110, 300) including a processor (305) and memory (310) having computer program code have been introduced herein. The memory (310) and the computer program code are configured to, with the processor (305) cause the apparatus (110, 300) to perform the actions as set forth herein. In one embodiment, the apparatus (110, 300) is operable (or configured) to identify boundaries (430) of a subframe (440) with major reference points (410) being aligned with the boundaries (430) and minor reference points (420) being distributed in time between the major reference points (410). Alternatively, the apparatus (110, 300) is operable to identify minor reference points (420) associated with a subframe (440), and identify minor reference points (420) on boundaries (430) of the subframe (440) as major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The apparatus (110, 300) is operable to schedule a transmission of a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630). The apparatus (110, 300) is operable to insert a guard period at a beginning of a subframe (440) in accordance with the transmission of the message (400). The apparatus (110, 300) is operable to select a duration of the message (400) in accordance with the transmission of the message (400).

The apparatus (110, 300) is operable to schedule a transmission of hybrid automatic repeat request message relative to the transmission of the message (400). The apparatus (110, 300) is operable to provide a full set of downlink control information (DCI) formats (910) on at least one of the major reference points (920) and provide a restricted set of DCI formats (930) on at least one of the minor reference points (940). The apparatus (110, 300) may be embodied in a radio access node (110, 300) of a communication system (100).

With continuing reference to the aforementioned FIGURES, an apparatus (105, 200) including a processor (205) and memory (210) having computer program code have been introduced herein. The memory (210) and the computer program code are configured to, with the processor (205) cause the apparatus (105, 200) to perform the actions as set forth herein. In one embodiment, the apparatus (105, 200) is operable (or configured) to identify boundaries (430) of a subframe (440) with major reference points (410) being aligned with the boundaries (430) and minor reference points (420) being distributed in time between the major reference points (410). Alternatively, the apparatus (105, 200) is operable to identify minor reference points (420) associated with a subframe (440), and identify minor reference points (420) on boundaries (430) of the subframe (440) as major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The apparatus (105, 200) is operable to transmit a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630). The apparatus (105, 200) is operable to insert a guard period at a beginning of a subframe (440) in accordance with the transmission of the message (400). The apparatus (105, 200) is operable to select a duration of the message (400) in accordance with the transmission of the message (400).

The apparatus (105, 200) is operable to retransmit the message (400) in response to a hybrid automatic repeat request process. The apparatus (105, 200) is operable to monitor a full set of downlink control information (DCI) formats (910) on at least one of the major reference points (920) and monitor a restricted set of DCI formats (930) on at least one of the minor reference points (940). The apparatus (105, 200) may be embodied in a user equipment (105, 200) of a communication system (100).

With continuing reference to the aforementioned FIGUREs, an apparatus (105, 200) including a processor (205) and memory (210) having computer program code have been introduced herein. The memory (210) and the computer program code are configured to, with the processor (205) cause the apparatus (105, 200) to perform the actions as set forth herein. In one embodiment, the apparatus (105, 200) is operable (or configured) to identify boundaries (430) of a subframe (440) with major reference points (410) being aligned with the boundaries (430) and minor reference points (420) being distributed in time between the major reference points (410). Alternatively, the apparatus (105, 200) is operable to identify minor reference points (420) associated with a subframe (440), and identify minor reference points (420) on boundaries (430) of the subframe (440) as major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The apparatus (105, 200) is operable to monitor a full set of downlink control information (DCI) formats (910) on at least one of the major reference points (920) and monitor a restricted set of DCI formats (930) on at least one of the minor reference points (940). The apparatus (105, 200) is operable to transmit a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630).

The apparatus (105, 200) is operable to insert a guard period at a beginning of a subframe (440) in accordance with the transmission of the message (400). The apparatus (105, 200) is operable to select a duration of the message (400) in accordance with the transmission of the message (400). The apparatus (105, 200) is operable to retransmit the message (400) in response to a hybrid automatic repeat request process. The apparatus (105, 200) may be embodied in a user equipment (105, 200) of a communication system (100).

Figure 13:
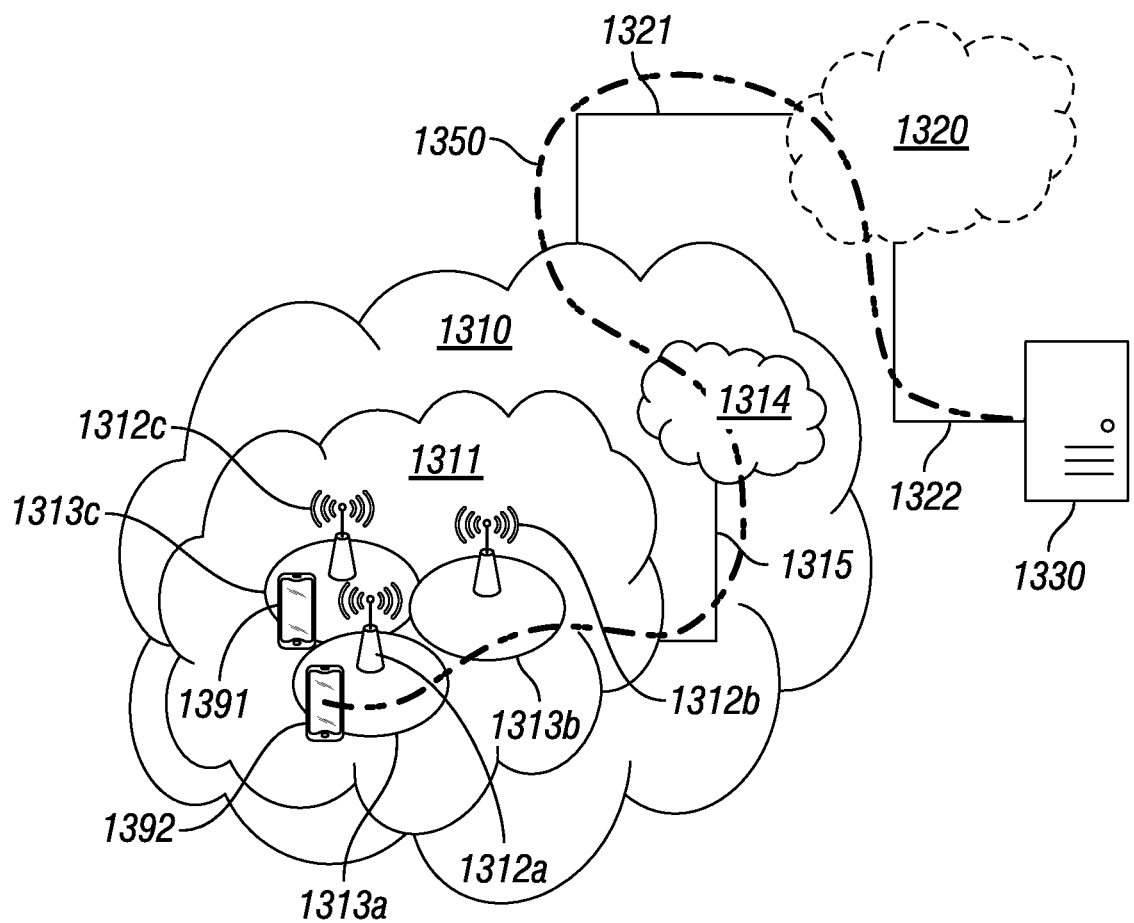
FIG. 13 illustrates a schematic view of an embodiment of a communication system including a communication network connected to a host computer.

Turning now to FIG. 13, illustrated is a schematic view of an embodiment of a communication system including a communication network (e.g., a 3GPP-type cellular network) 1310 connected to a host computer. The communication network 1310 includes an access network 1311, such as a radio access network, and a core network 1314. The access network 1311 includes a plurality of base stations 1312a, 1312b, 1312c, such as NBs, eNBs, gNBs or other types of wireless access points, each defining a corresponding coverage area 1313a, 1313b, 313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The communication network 1310 is itself connected to the host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the communication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may include two or more sub-networks (not shown).

The communication system of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Figure 14:
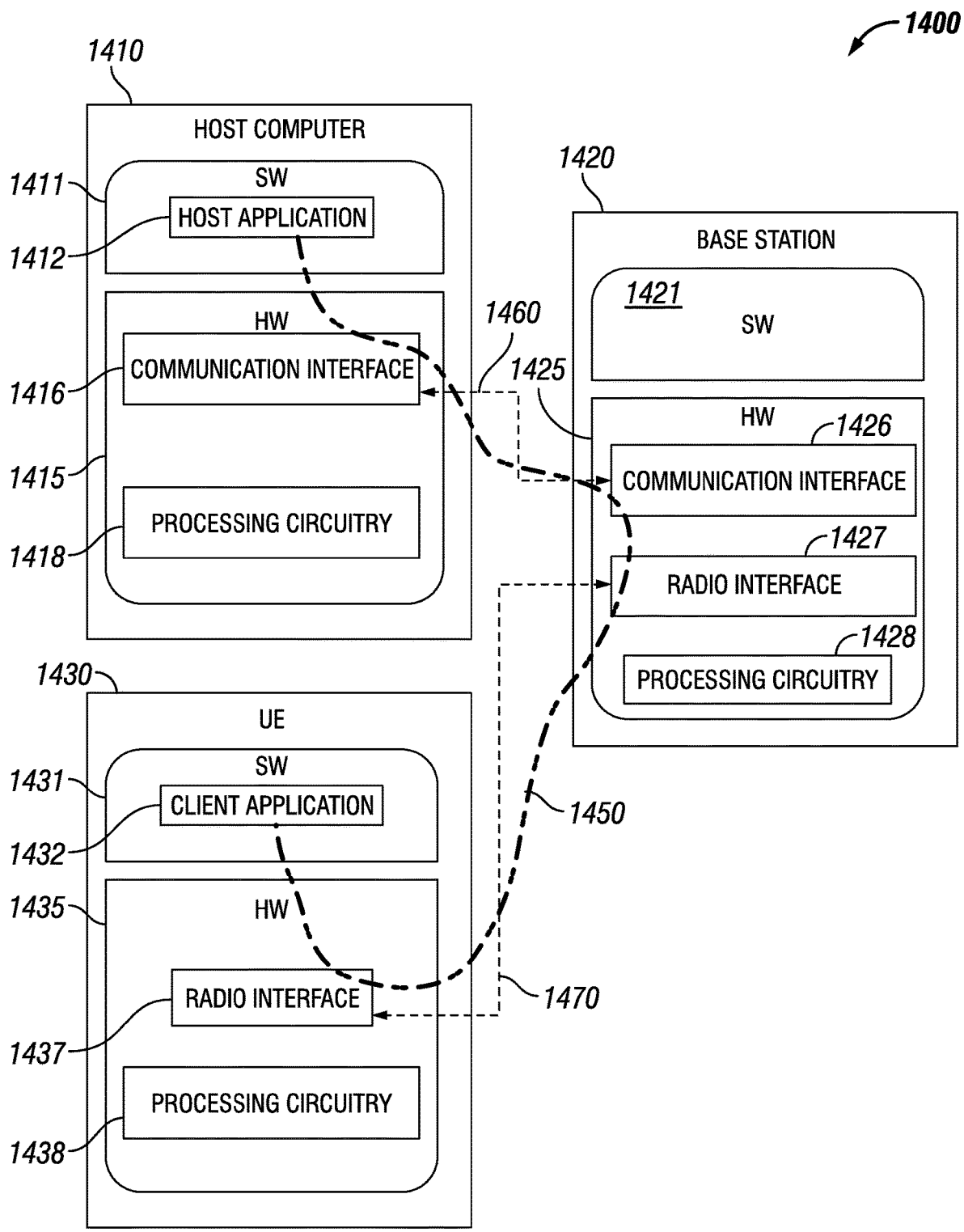
FIG. 14 illustrates a block diagram of an embodiment of a communication system.

Turning now to FIG. 14, illustrated is a block diagram of an embodiment of a communication system 1400. In the communication system 1400, a host computer 1410 includes hardware 1415 including a communication interface 1416 configured to set up and maintain a wired or wireless connection with an interface of a different communication device of the communication system 1400. The host computer 1410 further includes processing circuitry (a processor) 1418, which may have storage and/or processing capabilities. In particular, the processing circuitry 1418 may include one or more programmable processors, application-specific integrated circuits, field programmable gate arrays or combinations of these (not shown) adapted to execute instructions. The host computer 1410 further includes software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data which is transmitted using the OTT connection 1450.

The communication system 1400 further includes a base station 1420 provided in a communication system and including hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the communication system and/or through one or more intermediate networks outside the communication system. In the embodiment shown, the hardware 1425 of the base station 1420 further includes processing circuitry 1428, which may include one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430. The UE 1430 includes hardware 1435 having a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further includes software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

It is noted that the host computer 1410, base station 1420 and UE 1430 illustrated in FIG. 14 may be identical to the host computer 1330, one of the base stations 1312a, 1312b, 1312c and one of the UEs 1391, 1392 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or 'dummy' messages, using the OTT connection 1450 while it monitors propagation times, errors, etc.

With continuing reference to the aforementioned FIGUREs, a communication system (1400) including a host computer (1410) operable to execute a host application (1412), or method of operating the same, has been introduced herein. The host computer (1410) includes processing circuitry (1418) configured to provide user data, and a communication interface (1416) configured to forward the user data to a cellular network for transmission to a user equipment (1430). The cellular network includes a base station (1420) having a radio interface (1427) and processing circuitry (1428) configured to identify major reference points (410) and minor reference points (420) associated with a subframe (440). In accordance therewith, the base station (1420) can identify boundaries (430) of the subframe (440) with the major reference points (410) being aligned with the boundaries (430) and the minor reference points (420) being distributed in time between the major reference points (410), or identify the minor reference points (420) associated with the subframe (440), and identify the minor reference points (420) on boundaries (430) of the subframe (440) as the major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The processing circuitry (1428) of the base station (1420) is also configured to schedule a transmission of a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630). The processing circuitry (1428) of the base station (1420) is also configured to insert a guard period at a beginning of a subframe (440) in accordance with the transmission of the message (400). The processing circuitry (1428) of the base station (1420) is also configured to select a duration of the message (400) in accordance with the transmission of the message (400).

The processing circuitry (1428) of the base station (1420) is also configured to schedule a transmission of hybrid automatic repeat request message relative to the transmission of the message (400). The processing circuitry (1428) of the base station (1420) is also configured to provide a full set of downlink control information (DCI) formats (910) on at least one of the major reference points (920) and provide a restricted set of DCI formats (930) on at least one of the minor reference points (940).

With continuing reference to the aforementioned FIGUREs, a communication system (1400) including a host computer (1410) operable to execute a host application (1412), or method of operating the same, has been introduced herein. The host computer (1410) includes processing circuitry (1418) configured to provide user data, and a communication interface (1416) configured to forward the user data to a cellular network for transmission to a user equipment (1430) including radio interface (1437) and processing circuitry (1438) configured to identify major reference points (410) and minor reference points (420) associated with a subframe (440). In accordance therewith, the user equipment (1430) can identify boundaries (430) of the subframe (440) with the major reference points (410) being aligned with the boundaries (430) and the minor reference points (420) being distributed in time between the major reference points (410), or identify the minor reference points (420) associated with the subframe (440), and identify the minor reference points (420) on boundaries (430) of the subframe (440) as the major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The processing circuitry (1438) of the user equipment (1430) is also configured to transmit a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630). The processing circuitry (1438) of the user equipment (1430) is also configured to insert a guard period at a beginning of a subframe (440) in accordance with the transmission of the message (400). The processing circuitry (1438) of the user equipment (1430) is also configured to select a duration of the message (400) in accordance with the transmission of the message (400).

The processing circuitry (1438) of the user equipment (1430) is also configured to retransmit the message (400) in response to a hybrid automatic repeat request process. The processing circuitry (1438) of the user equipment (1430) is also configured to monitor a full set of downlink control information (DCI) formats (910) on at least one of the major reference points (920) and monitor a restricted set of DCI formats (930) on at least one of the minor reference points (940).

With continuing reference to the aforementioned FIGUREs, a communication system (1400) including a host computer (1410) operable to execute a host application (1412), or method of operating the same, has been introduced herein. The host computer (1410) includes processing circuitry (1418) configured to provide user data, and a communication interface (1416) configured to forward the user data to a cellular network for transmission to a user equipment (1430) including radio interface (1437) and processing circuitry (1438) configured to identify major reference points (410) and minor reference points (420) associated with a subframe (440). In accordance therewith, the user equipment (1430) can identify boundaries (430) of the subframe (440) with the major reference points (410) being aligned with the boundaries (430) and the minor reference points (420) being distributed in time between the major reference points (410), or identify the minor reference points (420) associated with the subframe (440), and identify the minor reference points (420) on boundaries (430) of the subframe (440) as the major reference points (410).

The major reference points (410) and the minor reference points (420) may correspond to a beginning of an orthogonal frequency division multiplexing (OFDM) symbol (460) associated with the message (400). The major reference points (410) and the minor reference points (420) may be uniformly distributed in time. A distribution of the major reference points (410) and the minor reference points (420) in time may be a function of a communication path for the message (400).

The processing circuitry (1438) of the user equipment (1430) is also configured to monitor a full set of downlink control information (DCI) formats (910) on at least one of the major reference points (920) and monitor a restricted set of DCI formats (930) on at least one of the minor reference points (940). The processing circuitry (1438) of the user equipment (1430) is also configured to transmit a message (400) to begin on one of the minor reference points (420) between the major reference points (410). The message (700) may begin on one of the minor reference points (710) and end on a major reference point (720). The message (800) may begin on one of the minor reference points (810) and end on another one of the minor reference points (820). The message (600) may span a major reference point (630).

The processing circuitry (1438) of the user equipment (1430) is also configured to insert a guard period at a beginning of a subframe (440) in accordance with the transmission of the message (400). The processing circuitry (1438) of the user equipment (1430) is also configured to select a duration of the message (400) in accordance with the transmission of the message (400). The processing circuitry (1438) of the user equipment (1430) is also configured to retransmit the message (400) in response to a hybrid automatic repeat request process.

While the disclosed subject matter has been presented above with reference to various embodiments, it will be understood that various changes in form and details may be made to the described embodiments without departing from the overall scope of the invention. As a result of the foregoing embodiments, a flexible transmission grid is provided, thereby improving latency among other things.

While processes in the figures and description may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method in a user equipment for optimizing the time of transmission for an uplink data message, comprising:
   identifying boundaries of a subframe with major reference points being aligned with said boundaries and minor reference points being distributed in time between said major reference points;
   monitoring a first set of downlink control information (DCI) formats on one of said major reference points and monitoring a second set of DCI formats on one of said minor reference points, wherein a DCI message received on one of said major reference points or said minor reference points indicates an uplink data message transmission time; and,
   transmitting an uplink data message, according to said uplink data message transmission time, to begin on one of said minor reference points between said major reference points, span at least one of said major reference points, and end on another one of said minor reference points, said uplink data message having a duration less than a subframe length.

2. The method as recited in claim 1 wherein said major reference points and said minor reference points correspond to a beginning of an orthogonal frequency division multiplexing (OFDM) symbol associated with said uplink data message.

3. The method as recited in claim 1 wherein said transmitting further comprises transmitting said uplink data message according to a selected duration.

4. The method as recited in claim 1 wherein said major reference points and said minor reference points are uniformly distributed in time.

5. The method as recited in claim 1 wherein a distribution of said major reference points and said minor reference points in time is a function of a communication path for said uplink data message.

6. The method as recited in claim 1 wherein second set of DCI formats is a subset of said first set of DCI formats.

7. The method as recited in claim 1 wherein transmitting further comprises transmitting said uplink data message relative to said at least one of said major reference points or an uplink scheduling grant.

8. The method as recited in claim 1 wherein said second set of DCI formats is identical to said first set of DCI formats.

9. The method as recited in claim 1 wherein said one of said minor reference points on which said second set of DCI formats is monitored are configured by radio resource control (RRC) signaling.

10. A user equipment adapted to optimize the time of transmission of an uplink data message, comprising:
- a processor; and,
- a memory including computer program code, wherein said processor, said memory, and said computer program code are collectively operable to:
  - identify boundaries of a subframe with major reference points being aligned with said boundaries and minor reference points being distributed in time between said major reference points;
  - monitor a first set of downlink control information (DCI) formats on one of said major reference points and monitor a second set of DCI formats on one of said minor reference points wherein a DCI message received on one of said major reference points or said minor reference points indicates an uplink data message transmission time; and,
  - transmitting an uplink data message, according to said uplink data message transmission time, to begin on one of said minor reference points between said major reference points, span at least one of said major reference points, and end on another one of said minor reference points or another one of said major reference points, said uplink data message having a duration less than a subframe length.

11. The apparatus as recited in claim 10 wherein said major reference points and said minor reference points correspond to a beginning of an orthogonal frequency division multiplexing (OFDM) symbol associated with said uplink data message.

12. The apparatus as recited in claim 10 wherein said memory and said computer program code are further configured to, with said processor, cause said apparatus to transmit said uplink data message according to a selected duration.

13. The apparatus as recited in claim 10 wherein said major reference points and said minor reference points are uniformly distributed in time.

14. The apparatus as recited in claim 10 wherein a distribution of said major reference points and said minor reference points in time is a function of a communication path for said uplink data message.

15. The apparatus as recited in claim 10 wherein said second set of DCI formats is a subset of said first set of DCI formats.

16. The apparatus as recited in claim 10 wherein said memory and said computer program code are further configured to, with said processor, cause said apparatus to transmit said uplink data message relative to said at least one of said major reference points or an uplink scheduling grant.

17. The apparatus as recited in claim 10 wherein said second set of DCI formats is identical to said first set of DCI formats.

18. The apparatus as recited in claim 10 wherein said one of said minor reference points on which said second set of DCI formats is monitored are configured by radio resource control (RRC) signaling.

* * * * *

UNITED STATES PATENT AND TRADEMARK OFFICE
CERTIFICATE OF CORRECTION

PATENT NO.        : 10,728,890 B2
APPLICATION NO.   : 15/551255
DATED             : July 28, 2020
INVENTOR(S)       : Parkvall et al.

It is certified that error appears in the above-identified patent and that said Letters Patent is hereby corrected as shown below:

In the Specification

In Column 1, Lines 3-6, delete "This application claims the benefit of U.S. Provisional Application No. 62/352,442 entitled "Flexible TransmissionGrid," filed Jun. 20, 2016, which is incorporated herein by reference." and insert -- CROSS-REFERENCE TO RELATED APPLICATION
This application is the National Stage of, and therefore claims the benefit of, International Application No. PCT/IB2017/053600 filed on June 16, 2017, entitled "FLEXIBLE TRANSMISSION GRID" which claims the benefit of Provisional Application No. 62/352,442 entitled "Flexible Transmission Grid," filed June 20, 2016. The above applications are commonly assigned with this National Stage application and are incorporated herein by reference in their entirety. --, therefor.

In Column 7, Line 20, delete "or 2)" and insert -- or --, therefor.

In Column 12, Line 24, delete "313c." and insert -- 1313c. --, therefor.

In Column 14, Line 21, delete "use equipment" and insert -- user equipment --, therefor.

Signed and Sealed this
Twenty-ninth Day of September, 2020

Andrei Iancu
*Director of the United States Patent and Trademark Office*